United States Patent
Tran et al.

(10) Patent No.: US 11,776,191 B2
(45) Date of Patent: Oct. 3, 2023

(54) SYSTEM AND METHOD FOR RECONSTRUCTING A 3D HUMAN BODY USING COMPACT KIT OF DEPTH CAMERAS

(71) Applicant: VIETTEL GROUP, Ha Noi (VN)

(72) Inventors: Van Duc Tran, Kien Xuong District (VN); Tien Dat Nguyen, Ha Noi (VN); Hai Anh Nguyen, Ha Noi (VN); Anh Tra Duong, Ha Noi (VN)

(73) Assignee: VIETTEL GROUP, Ha Noi (VN)

( * ) Notice: Subject to any disclaimer, the term of this patent is extended or adjusted under 35 U.S.C. 154(b) by 0 days.

(21) Appl. No.: 17/747,833

(22) Filed: May 18, 2022

(65) Prior Publication Data

US 2023/0033542 A1 Feb. 2, 2023

(30) Foreign Application Priority Data

Jul. 30, 2021 (VN) ............................. 1-2021-04762

(51) Int. Cl.
| | |
|---|---|
| G06T 13/40 | (2011.01) |
| G06T 7/70 | (2017.01) |
| G06T 7/80 | (2017.01) |
| H04N 13/239 | (2018.01) |
| G06T 5/00 | (2006.01) |
| G06T 5/20 | (2006.01) |
| H04N 13/111 | (2018.01) |
| G06T 7/60 | (2017.01) |
| G06T 17/20 | (2006.01) |

(52) U.S. Cl.
CPC .............. *G06T 13/40* (2013.01); *G06T 5/002* (2013.01); *G06T 5/20* (2013.01); *G06T 7/60* (2013.01); *G06T 7/70* (2017.01); *G06T 7/80* (2017.01); *G06T 17/20* (2013.01); *H04N 13/111* (2018.05); *H04N 13/239* (2018.05); *G06T 2200/04* (2013.01); *G06T 2207/10012* (2013.01); *G06T 2207/10028* (2013.01); *G06T 2207/20081* (2013.01); *G06T 2207/30196* (2013.01); *G06T 2207/30244* (2013.01); *G06T 2210/56* (2013.01)

(58) Field of Classification Search
CPC .............. G06T 7/70; G06T 7/80; G06T 13/40
See application file for complete search history.

(56) References Cited

U.S. PATENT DOCUMENTS

2021/0049811 A1* 2/2021 Fedyukov ................. G06T 7/60

* cited by examiner

*Primary Examiner* — Matthew Salvucci
(74) *Attorney, Agent, or Firm* — patenttm.us

(57) ABSTRACT

The invention presents a system and a method for 3D human reconstruction using a compact kit of depth cameras. Instead of using complex and expensive devices as in traditional methods, the proposed system and method employs a simple, easy-to-install system to accurately collect the human body shape. The generated model is capable of moving thanks to a skeleton system simulating the human skeleton. The proposed system includes four blocks: Data Collection Block, Point Cloud Standardization Block, Human Digitization Block and Output Block. The proposed method includes five steps: Point Cloud Collecting, Point Cloud Filtering, Point Cloud Calibrating, Point Cloud Optimizing and 3D Human Model Generating.

2 Claims, 3 Drawing Sheets

SYSTEM AND METHOD FOR RECONSTRUCTING A 3D HUMAN BODY USING COMPACT KIT OF DEPTH CAMERAS

FIELD OF THE INVENTION

The invention relates to a system and a method for digitizing a 3D human body using a compact kit of depth cameras. The proposed system and method could be applied in the field of modeling and simulation.

BACKGROUND

The typical traditional process of 3D reconstruction employs three-dimensions (3D) scanning technology, which emits and receives a structured-light pattern onto the digitized object. Regarding the field of 3D human reconstruction, this method installs a scanning booth/room or a handheld 3D scanner to collect point clouds of that person at different viewpoints. The obtained point clouds are employed to reconstruct a 3D version of the digitized person. An overview of the traditional method is illustrated in FIG. 1

An obvious disadvantage of the traditional method is that it requires collecting a large amount of data. Typically, at least 50 point clouds need to be collected to reconstruct a complete human body (with conditions that there are overlapped regions, no occlusion and hole region). Raw 3D point clouds obtained directly from 3D scanning devices are often contaminated with noise and outliners, therefore post-processing regularly involves two steps: removing noise from point clouds and connecting point clouds in order. Cumulative errors of the above processes result in a large error of captured data. In particular, regarding the output of the traditional method, some human body parts such as armpits, groin and fingers often look abnormal. In addition, handling a large amount of 3D information causes a long processing time, high computation and resources such as memory and storage capacity.

Another drawback of such method is that it requires either a complex bulky system of depth cameras or modern 3D scanners, entailing in a great cost for equipping machines and devices. Moreover, 3D scanning systems which project structured-light on the object to acquire depth information have a potential risk to human health. For example, shining high-intensity light in eyes could cause glare and discomfort for the person being digitized.

Besides, the traditional method and system can digitize static human body shapes only (3D human model is unable to move). This downside limits the applicability of the 3D human reconstruction technology.

SUMMARY OF THE INVENTION

A first purpose of the invention is to provide a system and a method for reconstructing human body shape using a compact kit of depth cameras. For this purpose, the system employs four main blocks, including:

Data Collection Block: collect point cloud data of people standing inside the depth camera system. In which, a module of two depth cameras is responsible for synchronizing data captured by the compact kit of depth cameras.

Point Clouds Standardization Block: process point cloud information obtained from the depth cameras. This block performs mathematical calculations to remove the noise and outliners from the point cloud by two modules: Point Cloud Filtering Module and Point Cloud Calibration Module.

Human Digitization Block: includes two distinguishing modules: Human Parametric Model Module and Point Cloud Optimization Module. In which, the Human Parametric Model Module is a parametric human model, this model composes parameters which could change to vary model shape (height, weight, chest circumference, waist circumference, . . . ). Besides, the parametric model includes skeleton joints for reconstructing movement of the human model. The Point Cloud Optimization Module computes shape control parameters to match point cloud data obtained from the Point Cloud Filtering Module. Therefore, the output of the Human Digitization Block is a set of optimized parameters that approximate a real human shape and the generated model is also movable.

Output Block: display the human body in 3D space with a pre-defined file format.

A second purpose of the invention is to provide a method for reconstructing human body shape using a compact kit of depth cameras. In particular, the proposed method include five main steps:

Step 1: Collecting point cloud data: this step aims to synchronize two images captured by two depth cameras in the acquisition stage and combine them into a sole point cloud. This point cloud is a raw image captured by the depth cameras which still contains noise and outliners. Filtering point cloud will be done in the next step. Step 1 is implemented on the Data Collection Block.

Step 2: Filtering point cloud data: This step aims to reduce noise on the surface of obtained point cloud and remove non-human data regions (caused by surrounding environment). The output of this step is a processed point cloud containing only human data (unwanted data such as ground or surrounding objects are eliminated). The processed point cloud is then calibrated in the next step to be suitable for the computation step. Step 2 is implemented on Point Clouds Standardization Block.

Step 3: Calibrating point cloud data: this step employs specified algorithms to move coordinate of the point cloud to a pre-defined coordinate system. Specifically, in the coordinate system, the origin (0) is placed at the top of the digitized person's head, the y-axis coincides with the vertical direction of the digitized person, the x-axis is perpendicular to the y-axis and coincident with the standing direction of the digitized person, the z-axis is determined based on the Cartesian coordinate system rule. Step 3 is implemented on the Point Clouds Standardization Block.

Step 4: Optimizing point cloud data: this step employs the optimization algorithm and uses point cloud calibrated in Step 3 as a target of the optimization process. Variable is the shape parameters of the human parametric model. The output of Step 4 is a set of parameters of the parametric model that approximate the body shape obtained from the point cloud. Step 4 is implemented on the Human Digitization Block.

Step 5: Generating a three-dimension human body model: this step is responsible for displaying the parametric model optimized in Step 4 in a three-dimensions form. This human model has fixed skeleton joints and complies with rules on the number of model's vertices, model's polygons. Therefore, this model not only simulates accurately the digitized human body shape but also is capable of moving.

DETAILED DESCRIPTION OF THE INVENTION

Figure 1:
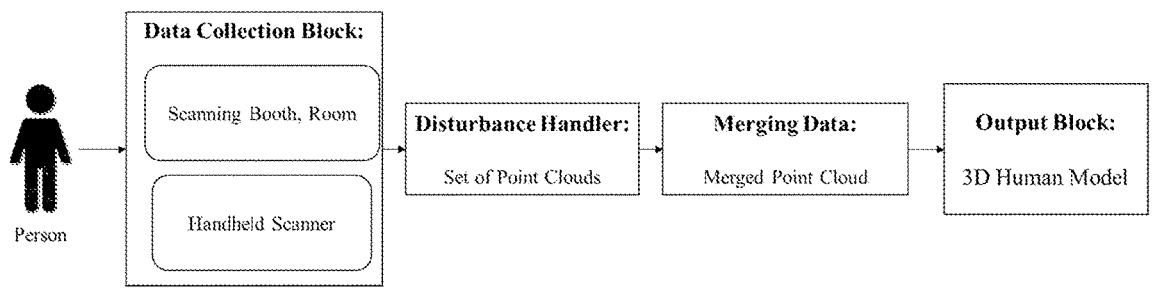
FIG. 1 is a block diagram of the traditional system for 3D human reconstruction from depth cameras.
Figure 2:
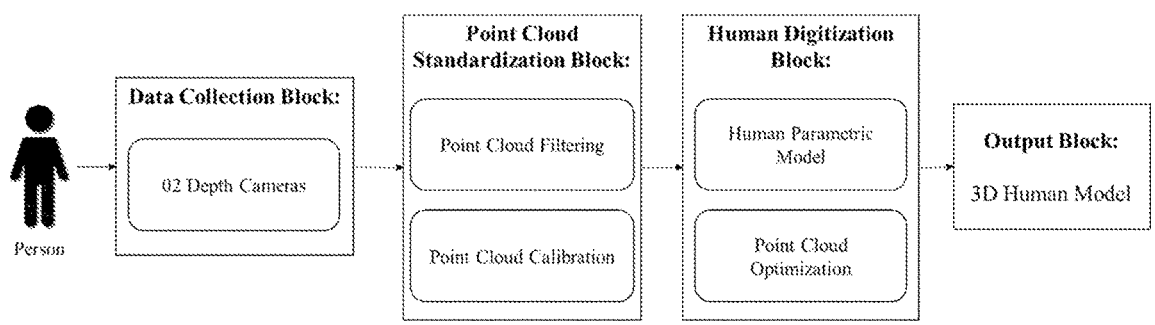
FIG. 2 is a block diagram of the 3D human reconstruction system in the invention.

As shown in FIG. 1 and FIG. 2, the invention relates to a novel method and system for 3D human reconstruction using a compact kit of depth cameras to substitute traditional complicated systems of cameras or handheld 3D scanners. The method employs two depth cameras and software containing a human digitization module to simplify and speed up reconstructing process, meanwhile ensuring the accuracy of generated 3D human body.

In this invention, the following terms are construed as follows:

"Digitized human body model" or "3D human body model" is data that uses laws of mesh points, mesh surfaces to represent a three-dimension shape of a real person's body shape ensuring two conditions: the generated 3D model has equivalent measurements to the digitized human body and the generated 3D model are capable of moving. This data is saved as 3D model in the FBX file extension, which supports storing movable 3D objects.

"Depth camera" is a camera collecting 3D shape of an object standing in fields of view of the camera;

"Human parametric model" is a model that can be transformed into different shapes based on parameters controlling the shape and parameters controlling the pose, the 3D human body model after being transformed has to comply with rules of the number of mesh points and the position of mesh surface compared to the original model.

Figure 3:
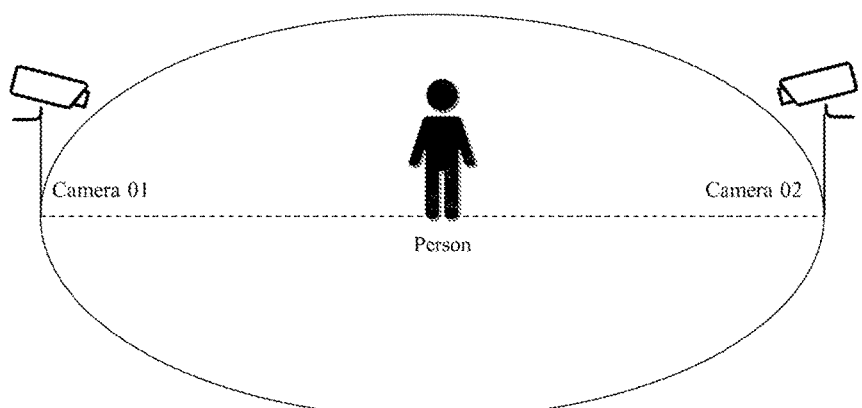
FIG. 3 illustrates the compact kit of depth cameras in the invention.

FIG. 2 indicates the difference between the inventive system and the traditional one. Specifically, the input for the former is acquired by the Data Collection Block through two depth cameras. Then, the Human Digitization Block employs collected data to calculate a 3D human body model. In particular:

The Data Collection Block includes two depth cameras responsible for capturing three-dimensions images of the digitized person. Output of the Data Collection Block is a raw point cloud captured by the two depth cameras. Besides, depth information acquired by the cameras is passed to a deep learning network to extract joint locations of the human body. This data is then used to interpolate into 3D positions of joints in the 3D space. Referring to FIG. 3, the compact kit of depth cameras includes two depth cameras following conditions as locating the camera system so that two cameras can capture full images of the digitized person (distance between cameras and the digitized person is far enough to capture from head to toe of the person). The angle between two cameras can be adjusted flexibly. After completing system installation, the position of depth cameras is fixed for 3D human reconstruction process.

The Point Cloud Standardization Block includes two modules: Point Cloud Filtering Module and Point Cloud Calibrating Module. In which, the former is accountable for removing redundant point clouds in the 3D image (such as point clouds of ground and ceiling where the user is standing) and removing noise caused by depth camera devices. Besides, the latter performs computations of spatial transformation to move obtained point cloud to a pre-defined coordinate system. In particular:

The Point Cloud Filtering Module includes two main components:

A pre-filter has the task of removing data points of objects appearing around the digitized person and the ground A fine filter has the task of removing points or clusters of points that are close or stuck to the human point cloud. These noises are caused by errors of the point cloud receivers.

Figure 4:
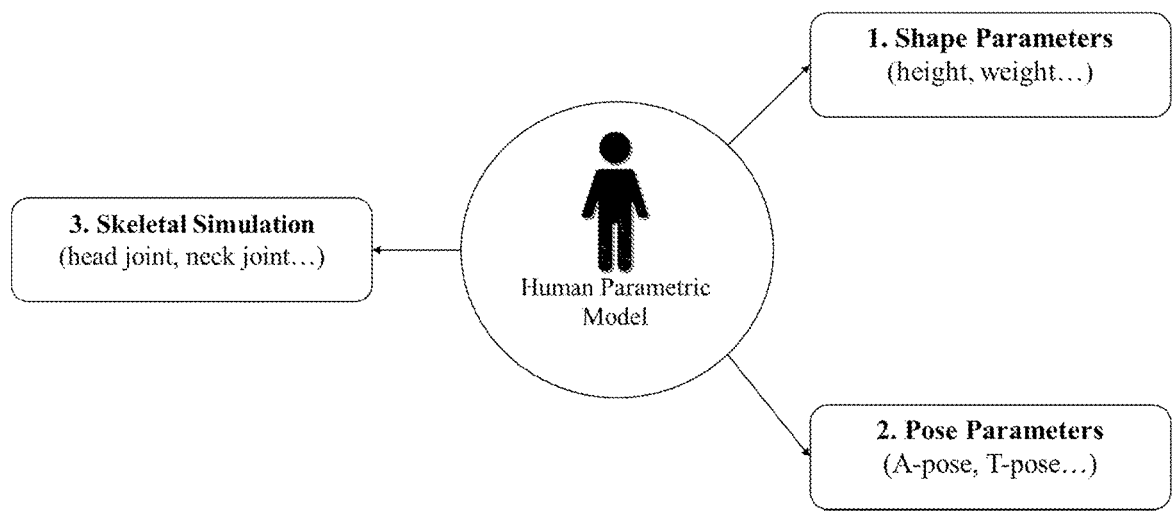
FIG. 4 is a block diagram of Human Parametric Model Module.

The Point Cloud Calibration Module aims to move the obtained point cloud to a standard coordinate system corresponding to 3D human reconstruction process. Specifically, in the coordinate system, the origin is located at the top of head of the human point cloud. The y-axis coincides with the vertical direction of the digitized person, the x-axis is perpendicular to the y-axis and coincident with the standing direction of the digitized person, the z-axis is determined based on the Cartesian coordinate system rule The Human Digitization Block includes two modules: Human Parametric Model Module and Point Cloud Optimization Module. In which, the Human Parametric Model Module is a parametric model containing shape control parameters such as height, weight, chest circumference, waist circumference, . . . . The Point Cloud Optimization Module calculates shape control parameters of Human Parametric Model Module to generate a 3D human model that approximates shape of the point cloud. In particular:

Referring to FIG. 4, the Human Parametric Model Module includes three main components: shape parameters; pose parameters; skeletal simulation. In which, the shape parameters are 10 parameters controlling and transforming human shape into different types as tall, short, fat, thin, . . . . The pose parameters are parameters of joints in the human skeletal system. The parametric model comprises 24 skeletal joints and 72 pose parameters. Skeletal simulation is a process of simulating bones system of the human body, which includes 24 joints (head, neck, right shoulder, left shoulder, . . . ). These joints are accountable for ensuring the movement of the human parametric model is similar to that of a real person. The parametric model is a crucial component in the 3D human reconstruction process.

Figure 5:
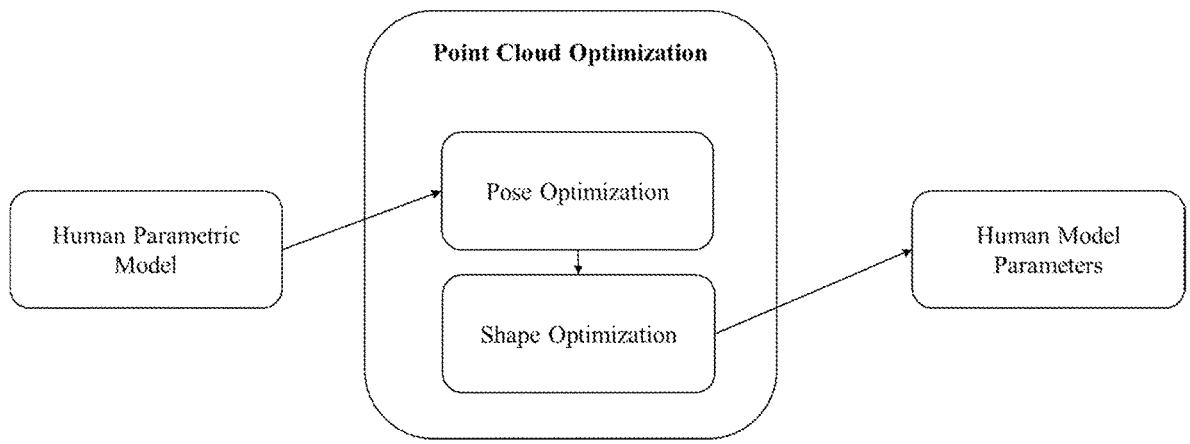
FIG. 5 is a diagram of steps for Point Cloud Optimization Module.

Referring to FIG. 5, the Point Cloud Optimization Module includes two main components: pose optimization and shape optimization. Firstly, length of bones and angle between joints of the human body are calculated by pose optimization. The main idea of this step is to minimize errors between the length of bones and angle of joints in the parametric model and those in the standardized point cloud. Secondly, shape parameters of the parametric model are similarly calculated by shape optimization to find a set of parameters corresponding with the standardized point cloud. By this way, the optimization process is implemented by minimizing the objective function which represents errors between the parametric model and the point cloud data. Output of this module is a set of model parameters of the human parametric model that approximates the real model shape. This set of parameters is transferred to the Output Block to generate a movable 3D model representing the digitized person.

Figure 6:
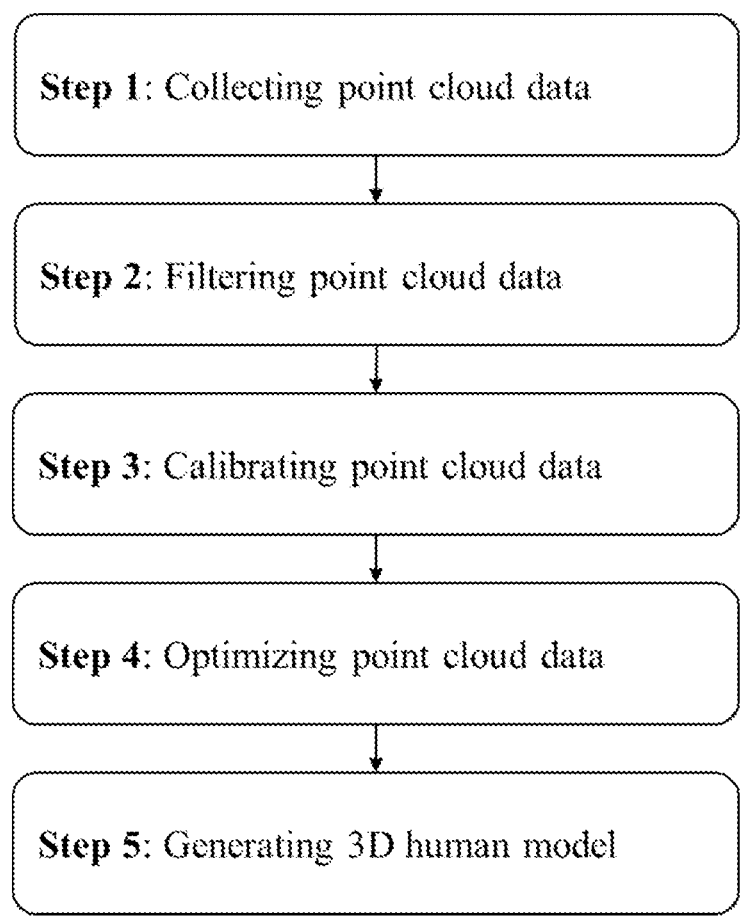
FIG. 6 is a block diagram of 3D human reconstruction method using the compact kit of depth cameras.
Figure 7:
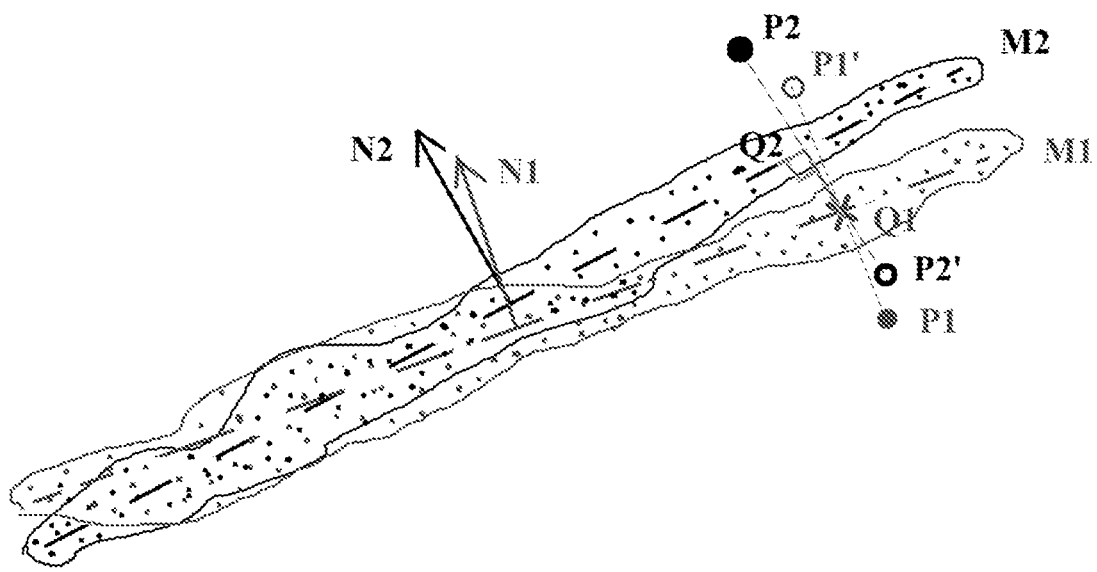
FIG. 7 illustrates Collecting Point Cloud step.

Referring to FIG. 6, the 3D human reconstructing using the compact kit of depth cameras includes the following steps:

Step 1: Collecting point cloud data;

In this step, point cloud data captured by two depth cameras are collected and aggregated into one raw point cloud data. This is implemented by determining relative positions between cameras in the depth camera system. Specifically, relative positions between cameras are calculated through an overlapping region of two cameras. Referring to FIG. 7, M1, M2 are planes of the overlapping region of two cameras, M1, M2 is a theoretically uniform plane. N1, N2 are normal vectors of M1, M2 respectively. Then, determine P1, P1' as two hypothesis points which are symmetric and equidistant from M1 at a distance d (d=const) and P2, P2' are respective points of P1, P1' on the plane M2. Q1, Q2 are intersections of ray P1P1' with plane M1 and P2P2' with plane M2, respectively. Each depth camera can observe only one of two points, for example, the first camera can observe P1 only, the second camera can observe P2 only. Then, P1P1'=P2P2' is the absolute exact distance, P1P2 is a determined distance after aggregating 02 point clouds. Thus, the composite error of 02 point clouds in the direction perpendicular to the plane M1, M2 will be determined by the following formula:

$$E_{\vec{n}} = |P_1 P_1' - P_1 P_2|$$

Where $\vec{n} \approx \vec{N_1} \approx \vec{N_2}$ is vector determining errors, with P1P1' being small enough:

$$E_{\vec{n}} \approx Q_1 Q_2.$$

The main idea of this step is to transform the mentioned overlapping region of two depth cameras so that Q1 and Q2 are coincident to determine the relative spatial coordinates of two depth cameras.

Step 2: Filtering point cloud data;

Step 2 performs pre-filter and fine filter in Point Cloud Filtering Module. In particular:

Pre-filter: connecting position data of 3D joints to form a human skeleton. With each bone in the skeleton, create a cylinder that has the same length as the bone and a defined radius (different bones of different body parts as arm, leg, . . . will have different radius). Points standing outside the cylinder will be removed, thereby eliminating objects surrounding the digitized person.

Fine Filter: Using algorithms for statistical outlier removal. The point cloud is placed following a standard distribution. The Expectation-maximization algorithm is then applied to estimate parameters of the statistical model. The final step is calculating the probability of elements belonging to the original data, elements with low probability will be considered as outliners and removed.

Output of this step is a point cloud that has been processed, containing only human data and removing irrelevant data already. This point cloud will be calibrated in the next step to suit the calculation step.

Step 3: Calibrating point cloud data;

This is a crucial step preparing for 3D human reconstruction process. The purpose here is to move the obtained point cloud to a standard coordinate system. Specifically, spatial transformation algorithms are employed to move the origin to the top of the human head, the y-axis coincides with the vertical direction of human, the x-axis is perpendicular to the y-axis and coincides with the standing direction of human. The z-axis is determined based on the Cartesian coordinate system rule.

Step 4: Optimizing point cloud data;

3D joints data are used to determine relatively the length of bones and the angles between joints in the real human body. From there, using interpolation to regress parameters of bones' length and parameters of pose that are relative to the real human body in the point cloud. Pose parameters and shape parameters of the parametric model are initialized from the initial set of parameters and iteratively changed by the optimization algorithm to find a solution that minimizes the below objective function:

$$L = \frac{1}{n} \sum_i k \| P_{SMPL} - P_{NN} \|$$

In which:

$P_{SMPL}$: a point on the parametric model;

$P_{NN}$: a point on the point cloud closest to $P_{SMPL}$;

k: weight, k=1 if $P_{SMPL}$ is inside the point cloud, k>1 if $P_{SMPL}$ is outside the point cloud;

n: the number of sampling points on the parametric model

To determine whether $P_{SMPL}$ is inside or outside the point cloud data:

Determine normal vector $\vec{n}$ of each $P_{SMPL}$ (the normal vector always points from inside model to outside)

Determine direction vector $\vec{u} = P_{SMPL} - P_{NN}$

If the angle between $\vec{u}$ and $\vec{u}$ is small than 180 degree, $P_{SMPL}$ is inside the point cloud, otherwise $P_{SMPL}$ is outside the point cloud.

Step 5: Generating 3D human model;

This step is executed in the Output Block, a human model is generated from results of digitizing process conforming to pre-defined rules. This model is fixed with the number of model vertex is 6890 and model polygon is 13444. Besides, in order that the generated model is movable, the simulated skeletal system is generated appropriately for the generated model according to the rules of the human parametric model.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

The invention claimed is:

1. A system for 3D human reconstruction using a compact kit of depth cameras, including four blocks:

a data collection block including a module of two depth cameras aims to capture 3D images of a digitized person; output of the data collection block is a raw point cloud data which is captured by the depth cameras, depth data obtained by the two cameras is passed to a deep learning network to extract positions of human joints in the depth data; then using this data to interpolate 3D positions of human joints in 3D space, a distance between cameras and the digitized person is set up carefully to ensure capturing full image of the person (from head to toe) (about ≥ 1.5 m), an angle between two cameras can be adjusted flexibly, after completing system installation, positions of two depth cameras are fixed for a 3D human reconstruction process;

a point cloud standardization block includes two modules: a point cloud filtering module and a point cloud calibrating module, in which:

the point cloud filtering module is responsible for removing redundant point clouds in the 3D image (for example: point clouds of the ground, ceiling . . . ) and removing noise caused by camera devices; the point cloud filtering module comprises a pre-filter and a fine filter, In particular:
- the pre-filter is accountable for removing data of objects appearing around the digitized person and the ground;
- the fine filter is accountable for removing points or clusters of points which stay close or stuck to human's point cloud, these points are caused by errors of point cloud receivers;

the point cloud calibrating module performs mathematical calculations of spatial transformation to move the obtained point cloud to a pre-defined coordinate system, being ready for a human digitization block, specifically, in the coordinate system, the origin is placed at the top of a head of the human point cloud; the y-axis is coincident with vertical direction of the digitized person, the x-axis is perpendicular to the y-axis and coincident with a standing direction of the digitized person, the z-axis is determined based on a Cartesian coordinate system rule;

the human digitization block includes two modules: a human parametric model module and a point cloud optimization module, in which:
- the human parametric model module is a model comprising shape control parameters such as height, weight, chest circumference, waist circumference parameters; the human parametric model module includes three main components: shape parameters; pose parameters; skeletal simulation, in particular:
  - shape parameters are 10 parameters controlling and transforming the human body shape into different types (such as tall, short, fat, thin, . . . );
  - pose parameters are joints parameters of a skeletal system which simulates the human body, the number of joints in the parametric model is 24 and the number of pose parameters is 72;
  - skeletal simulation is to simulate a bones system of the human body, including 24 joints (head, neck, right shoulder, left shoulder, . . . ), these joints are accountable for ensuring the movement of the human parametric model is similar to that of a real person;
- the point cloud optimization module calculates shape control parameters obtained by the human parametric model module so that the shape generated after the optimization process approximates the shape of the point cloud, the point cloud optimization module includes two main components: pose optimization, shape optimization, firstly, length of bones and angle between joints of the human body are calculated by pose optimization, the main idea of this step is to minimize errors between length of bones, angle of joints in the parametric model and those in the calibrated point cloud, next, shape parameters of the parametric model are similarly calculated by shape optimization to find a set of parameters according to the calibrated point cloud, by this way, the optimization process is implemented by minimizing the objective function which represents errors between the parametric model and point cloud data, the output of this module is a set of model parameters of the human parametric model that approximates the real model shape, this set of parameters is passed to an output block to generate a movable 3D model representing the digitized person;

the output block: displaying the human body in 3D space with a pre-defined file format.

2. A method for 3D human reconstruction using a compact kit of depth cameras, including the following steps:

step 1: collecting point cloud data,
in this step, point cloud data captured by the two depth cameras are collected and aggregated into one raw point cloud data, the point cloud aggregation is implemented by determining relative positions between cameras in the compact kit of depth cameras, which are calculated through an overlapping region of two cameras;

step 2: filtering point cloud data;
in this step, processing in turn pre-filter and fine-filter in a point cloud filtering module, in particular:
pre-filter: connecting positions of 3D joints to form a human skeleton having bones, with each bone in the skeleton, create a cylinder that has a same length as the bone and a defined radius (different bones of different body parts as arm, leg, . . . will have different radius), points standing outside the cylinder will be removed, thereby eliminating objects around the digitized person;
fine filter: using algorithms for statistical outlier removal, the point cloud is placed following a standard distribution, the expectation-maximization algorithm is then applied to estimate parameters of the statistical model, the final step is calculating a probability of elements belonging to the original data, elements with a low probability will be considered as outliners and removed;
output of this step is a point cloud that has been processed, containing only human data and removing irrelevant data already, this point cloud will be calibrated in the next step to suit the calibration step;

step 3: calibrating point cloud data;
point cloud calibration is a crucial step in preparing for the 3D human reconstruction process, the purpose here is to move the obtained point cloud to a standard coordinate system, specifically, spatial transformation algorithms are employed to move the origin to the top of the human head, the y-axis coincides with a vertical direction of human, the x-axis is perpendicular to the y-axis and coincides with a standing direction of human, the z-axis is determined based on a Cartesian coordinate system rule;

step 4: optimizing point cloud data;
3D joints data are used to determine relatively the length of bones and angles of joints in the real human body, from there, using interpolation to regress parameters of bones' length and parameters of pose that are relative to the real human body in the point cloud, pose parameters and shape parameters of the parametric model are initialized from the initial set of parameters and iteratively changed by the optimization algorithm to find a solution that minimizes below objective function:

$$L = \frac{1}{n}\sum_i k \|P_{SMPL} - P_{NN}\|$$

in which:
- $P_{SMPL}$: a point staying on the parametric model;
- $P_{NN}$: a point on the point cloud closest to $P_{SMPL}$;
- k: weight, k=1 if $P_{SMPL}$ is inside the point cloud, k>1 if $P_{SMPL}$, is outside the point cloud;
- n: the number of sampling points on the parametric model;

to determine whether $P_{SMPL}$ is inside or outside the point cloud data:

determine normal vector $\vec{n}$ of each $P_{SMPL}$ (the normal vector always points from inside model to outside), determine direction vector $\vec{u} = P_{SMPL} - P_{NN}$, if the angle between $\vec{u}$ and $\vec{n}$ is small than 180 degree, $P_{SMPL}$ is inside the point cloud, otherwise $P_{SMPL}$ is outside the point cloud;

step 5: generating 3D human model, this step is executed in an output block, a human model is generated from results of digitizing process conforming to pre-defined rules, this model is fixed with the number of model vertex is 6890 and model polygon is 13444, besides, in order that the generated model is movable, a simulated skeletal system is generated appropriately for the generated model according to the rules of the human parametric model.

* * * * *